(12) United States Patent
Sonobe

(10) Patent No.: US 9,705,585 B2
(45) Date of Patent: Jul. 11, 2017

(54) RELAYING DEVICE AND COMMUNICATION SYSTEM

(71) Applicant: Icom Incorporated, Osaka (JP)

(72) Inventor: Hirotaka Sonobe, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 15/294,128

(22) Filed: Oct. 14, 2016

(65) Prior Publication Data

US 2017/0033859 A1 Feb. 2, 2017

Related U.S. Application Data

(63) Continuation of application No. 13/953,603, filed on Jul. 29, 2013, now Pat. No. 9,503,908.

(30) Foreign Application Priority Data

Dec. 26, 2012 (JP) .................. 2012-283574

(51) Int. Cl.
*H04B 7/15* (2006.01)
*H04W 74/00* (2009.01)
(Continued)

(52) U.S. Cl.
CPC .............. *H04B 7/15* (2013.01); *H04B 3/36* (2013.01); *H04L 43/16* (2013.01); *H04L 61/605* (2013.01);
(Continued)

(58) Field of Classification Search
None
See application file for complete search history.

(56) References Cited

U.S. PATENT DOCUMENTS

| 4,860,359 A | 8/1989 | Eicher |
| 5,327,461 A | 7/1994 | Kushige |

(Continued)

FOREIGN PATENT DOCUMENTS

| JP | 2001-136112 A | 5/2001 |
| JP | 2001-313740 A | 11/2001 |

(Continued)

OTHER PUBLICATIONS

European Search Report for EP13186417 sent on Sep 5, 2014 (Disclosed with IDS in the parent U.S. Appl. No. 13/953,603 on Sep. 18, 2014).

*Primary Examiner* — Margaret G Mastrodonato
(74) *Attorney, Agent, or Firm* — Muncy, Geissler, Olds & Lowe, P.C.

(57) ABSTRACT

A relaying device includes an uplink interface that continuously receives an audio signal in communication, a wireless apparatus interface to which a repeater acting as a wireless relaying apparatus is connected, a voice buffer that buffers the audio signal, and a control unit. The control unit performs a VOX processing of detecting whether or not a level of the audio signal is equal to or higher than a preset threshold. When the level of the audio signal is equal to or higher than the threshold, the control unit starts buffering the audio signal in the voice buffer, and requests the repeater to reserve a channel. After receiving, from the repeater, a reply indicating that a channel has been reserved, the control unit reads the buffered audio signal from the voice buffer, and transfers this audio signal to the repeater.

3 Claims, 8 Drawing Sheets

(51) Int. Cl.

| | | |
|---|---|---|
| *H04L 12/26* | (2006.01) | |
| *H04L 29/12* | (2006.01) | |
| *H04W 28/14* | (2009.01) | |
| *H04B 3/36* | (2006.01) | |
| *H04W 88/16* | (2009.01) | |
| *H04M 7/00* | (2006.01) | |
| *H04W 80/10* | (2009.01) | |
| *H04W 16/26* | (2009.01) | |
| *H04W 72/04* | (2009.01) | |
| *H04W 28/26* | (2009.01) | |

(52) U.S. Cl.
CPC ........... *H04W 16/26* (2013.01); *H04W 28/14* (2013.01); *H04W 72/04* (2013.01); *H04W 74/004* (2013.01); *H04M 7/006* (2013.01); *H04W 28/26* (2013.01); *H04W 80/10* (2013.01); *H04W 88/16* (2013.01)

(56) References Cited

U.S. PATENT DOCUMENTS

| | | |
|---|---|---|
| 2003/0224825 A1 | 12/2003 | Cox et al. |
| 2004/0219940 A1 | 11/2004 | Kong et al. |
| 2005/0232229 A1* | 10/2005 | Miyamoto ........ H04L 29/06027 370/351 |
| 2006/0229093 A1 | 10/2006 | Bhutiani |
| 2007/0195735 A1 | 8/2007 | Rosen et al. |
| 2007/0274297 A1 | 11/2007 | Cross et al. |
| 2008/0247384 A1* | 10/2008 | Arauz-Rosado .... H04L 29/1216 370/352 |

FOREIGN PATENT DOCUMENTS

| | | |
|---|---|---|
| JP | 3115163 U | 11/2005 |
| JP | 2011-135289 A | 7/2011 |
| JP | 2011-135290 A | 7/2011 |
| JP | 2011-135291 A | 7/2011 |

* cited by examiner

| Local Station ID | 0001 | 400 |
| --- | --- | --- |
| Belonging Group No. | 02, 03 | 401 |

Fig. 4A

```
┌─────────────────────────────────┐ ╭200
│     Local Station IP Address    │
├─────────────────────────────────┤ ╭201
│ Local Station Telephone Number (URI) │
└─────────────────────────────────┘
```

Fig. 4B

Outgoing Telephone Number Conversion Table  ╭203

| Call type (Group/Individual) | Destination ID | Destination Telephone Number |
|---|---|---|
| Group | 03 | 2000-0001 |
| Group | 04 | 2000-0021 |
| Individual | 0003 | 1000-0001 |
| Individual | 0004 | 1000-0201 |

Fig. 4C

Reception Transceiver Number Conversion Table  ╭204

| Call type (Group/Individual) | Destination ID | Transceiver Number |
|---|---|---|
| Group | 01 | 21 |
| Group | 02 | 22 |
| Individual | 0001 | 11 |
| Individual | 0002 | 12 |

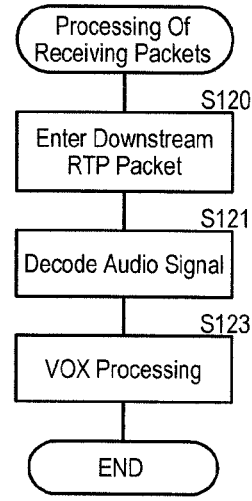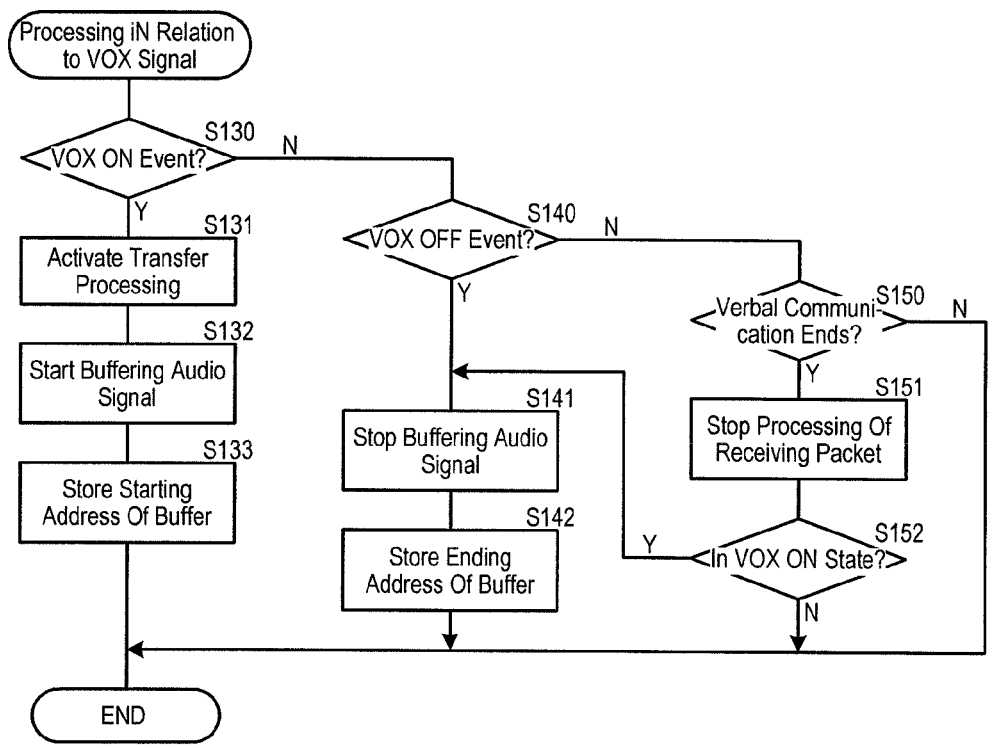

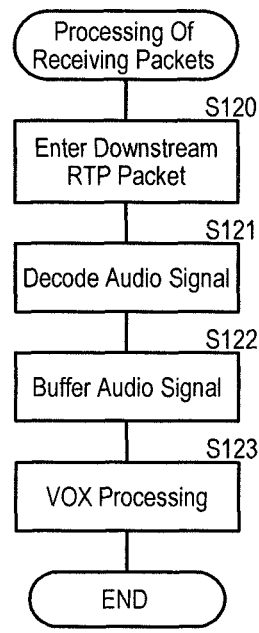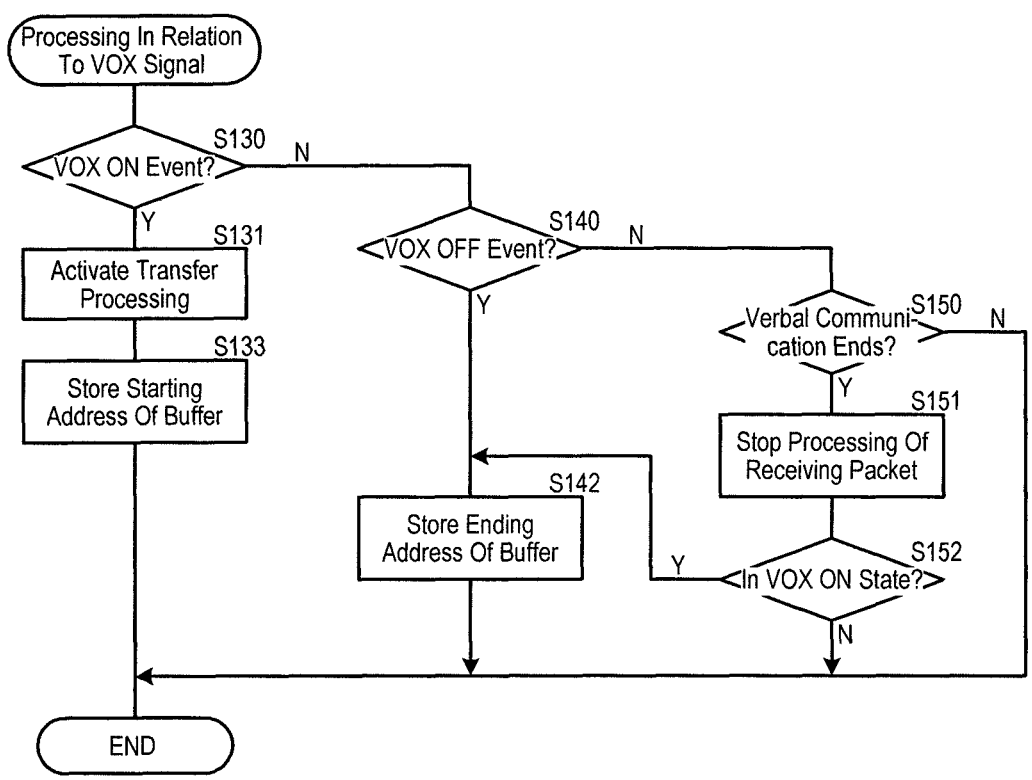

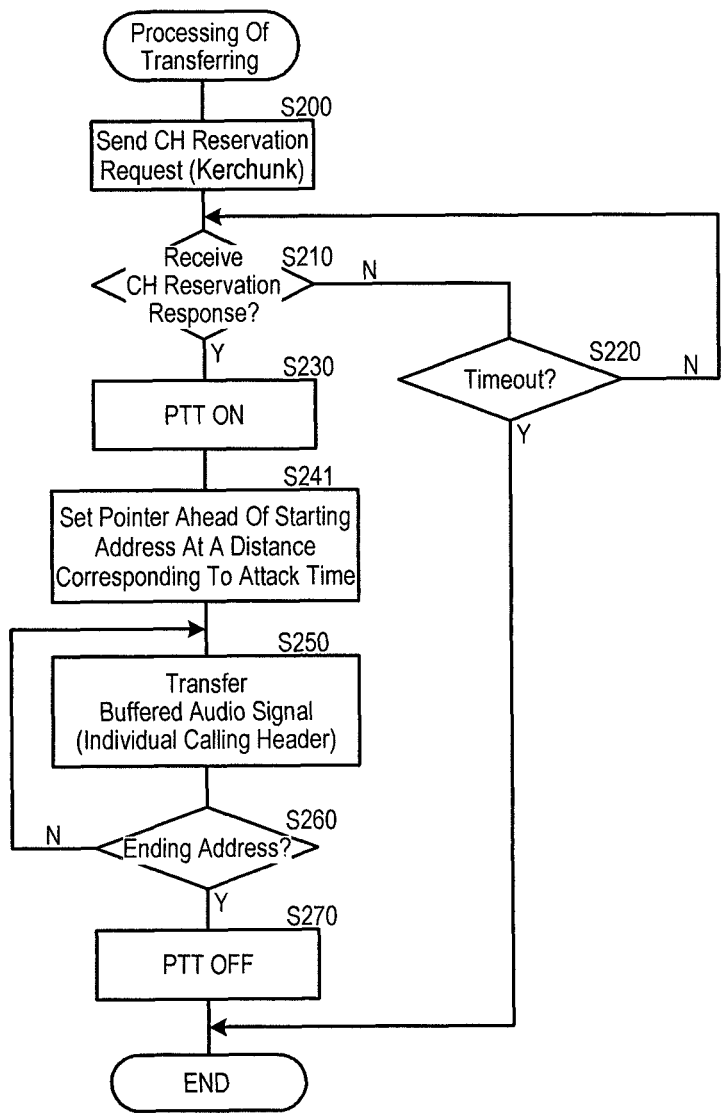

RELAYING DEVICE AND COMMUNICATION SYSTEM

CROSS REFERENCE TO RELATED APPLICATIONS

This application is a continuation of U.S. application Ser. No. 13/953,603 filed on Jul. 29, 2013, which is based on and claims priority to Japanese Patent Applications No. 2012-283574 filed on Dec. 26, 2012, the disclosures of which are incorporated herein by reference.

BACKGROUND OF THE INVENTION

1. Field of the Invention

The present invention relates to a relaying device and a communication system, which mediate communication between a transceiver and a telephone set over a network.

2. Description of the Related Art

Japanese Unexamined Patent Application Publication No. 2011-135290 discloses a relaying device that enables verbal communication to be conducted between a wireless apparatus, such as a transceiver, and a telephone set over an IP telephone system having a network or over a wired phone line. The relaying device of this document operates in the following manner. First, the relaying device makes a SIP response in response to a call from a device at the other end, and continuously receives audio packets which the device at the other end has continuously sent over a network. Then, the relaying device determines whether or not an audio signal in the received audio packets has a higher level than a threshold at which an audio signal is regarded as a speech sound (VOX processing). If the level of the audio signal is higher than the threshold, the relaying device causes a repeater as a wireless relaying apparatus to enter a transmission state (VOX-ON), and transfers this audio signal to the repeater. In response, the repeater wirelessly sends the audio signal to a terminal.

Upon receiving a VOX-ON signal or a PTT-ON signal from the relaying device, the repeater first reserves a channel (wireless communication channel), and then starts sending the audio signal. In this case, specifically, the repeater cannot send the audio signal promptly upon receiving the PTT-ON signal, because it requires time to reserve a channel. If an idle channel is present, the repeater spends time of 100 ms or so to perform a processing of reserving a channel. Otherwise, if no idle channel is present, the repeater needs to wait for any idle channel to be made available.

However, a typical relaying device is configured to send an audio signal simultaneously with a VOX-ON signal, and thus a part of the audio signal which the repeater receives in the course of reserving a channel is discarded without being sent to a transceiver. As a result, there are cases where the beginning of the received audio signal is clipped off, and only the remaining part thereof is heard from the transceiver.

SUMMARY OF THE INVENTION

An object of the present invention is to provide a relaying device that is capable of mediating communication between a telephone set and a wireless apparatus without clipping off the beginning of verbal communication.

According to a first aspect of the present invention, a relaying device includes: an uplink interface that continuously receives an audio signal in communication; a wireless apparatus interface to which a repeater acting as a wireless relaying apparatus is connected; a voice buffer that buffers the audio signal; and a control unit. The control unit performs a VOX processing of detecting whether or not a level of the audio signal is equal to or higher than a preset threshold. When the level of the audio signal is equal to or higher than the threshold, the control unit starts buffering the audio signal in the voice buffer, and requests the repeater to reserve a channel. After receiving, from the repeater, a reply indicating that a channel has been reserved, the control unit reads the buffered audio signal from the voice buffer, and transfers this audio signal to the repeater.

According to a second aspect of the present invention, a relaying device includes: an uplink interface that continuously receives an audio signal in communication; a wireless apparatus interface to which a repeater acting as a wireless relaying apparatus is connected; a voice buffer that buffers the audio signal; and a control unit. The control unit continuously buffers the audio signal in the voice buffer, and performs a VOX processing of detecting whether or not a level of the audio signal is equal to or higher than a preset threshold. When the level of the audio signal is equal to or higher than the threshold, the control unit stores a write address of the voice buffer where the audio signal is stored at this time, as a starting address, and requests the repeater to reserve a channel. After receiving, from the repeater, a reply indicating that a channel has been reserved, the control unit reads the audio signal buffered in the voice buffer from a location ahead of the starting address by a predetermined time, and transfers the audio signal to the repeater.

In the above-described invention, the predetermined time may correspond to an attack time in the VOX processing.

In the above-described invention, in the case where the control unit has not received a reply from the repeater over a predetermined period or longer since requesting the repeater to reserve a channel, the control unit may abort the transfer of the buffered audio signal.

According to the present invention, the relaying device buffers an audio signal that has been received via the uplink interface, until the repeater connected to the wireless apparatus interface reserves a channel. Consequently, even when it takes time to reserve a channel, the beginning of the audio signal sent from the repeater is not clipped off.

BRIEF DESCRIPTION OF THE DRAWINGS

FIGS. 4A to 4C show contents stored in a storage unit of the relaying device.

FIGS. 6A and 6B are flowcharts of an operation of the relaying device during verbal communication.

FIGS. 8A and 8B are flowcharts of an operation of a relaying device according to another embodiment of the present invention during verbal communication.

FIG. 9 is a flowchart of an operation of the relaying device according to another embodiment of the present invention during verbal communication.

DESCRIPTION OF THE PREFERRED EMBODIMENTS

Figure 1:
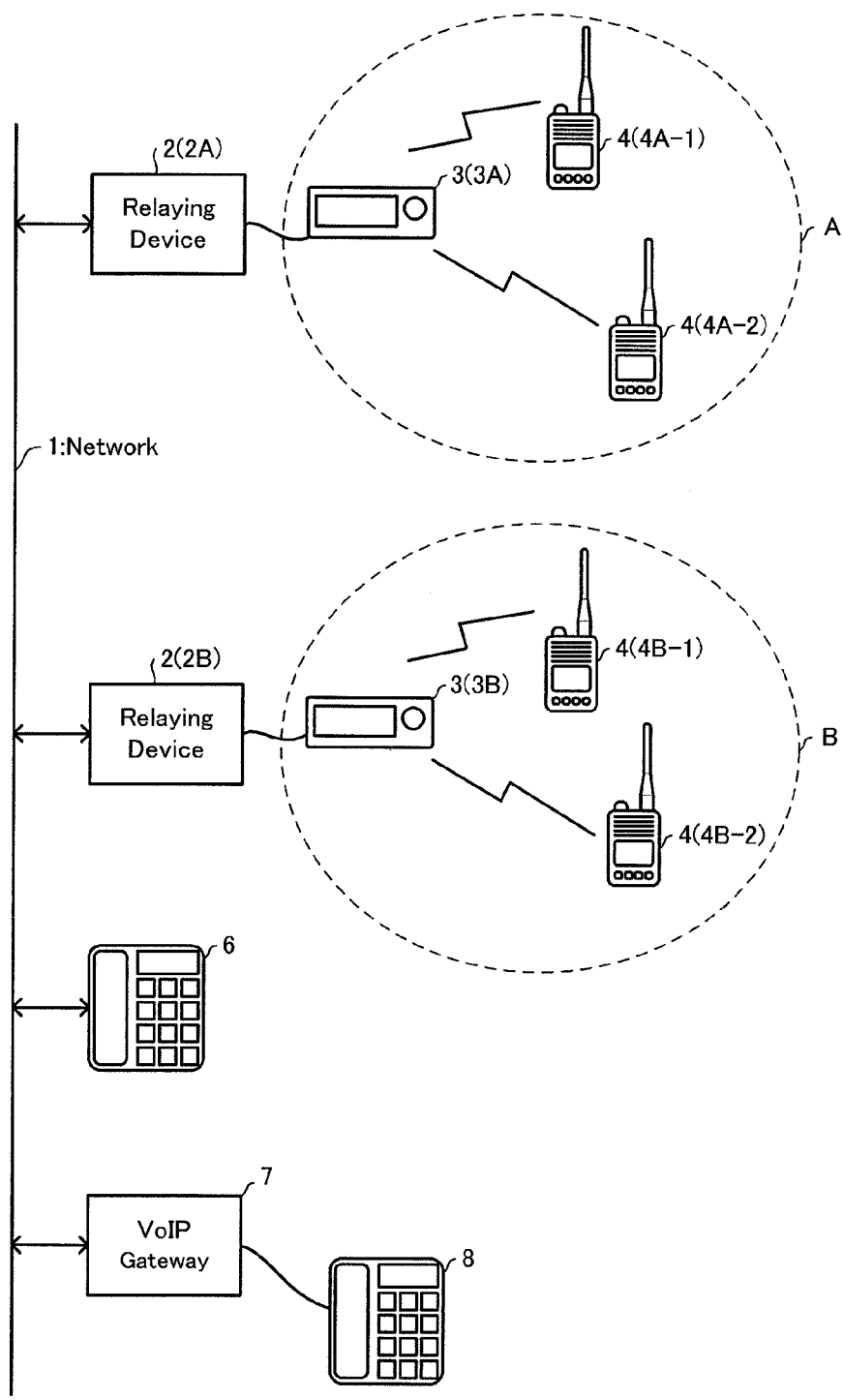
FIG. 1 shows a configuration of a communication system including relaying devices according to an embodiment of the present invention.

Hereinafter, a description will be given of a relaying device according to an embodiment of the present invention, with reference to the accompanying drawings. FIG. 1 shows a configuration of a communication system including relaying devices according to an embodiment of the present invention. The relaying device 2 is configured to relay outgoing and incoming calls between a transceiver 4 and an IP telephone set 6 or a telephone set 8 and to mediate verbal communication therebetween. In addition, the relaying device 2 is configured to control timing of PTT-ON (or VOX-ON) for the repeater 3 and timing of transferring an audio signal from the telephone set 6 or 8, in such a way that the beginning of a voice sound from the telephone set 6 or 8 is not clipped off on the transceiver 4.

A network 1 may employ Ethernet™ LAN or the Internet. The one or more relaying devices 2 (the two relaying devices 2 in FIG. 1) are connected to the network 1. The relaying devices 2 (2A and 2B) cover different communication areas A and B, respectively. The relaying device 2 is connected to the repeater 3 (3A or 3B) acting as a relay transceiver. The repeater 3 is a push-to-talk (PTT) and half-duplex type of stationary transceiver. In the communication area of the repeater 3, the one or more transceivers 4 (4A-1 and 4A-2 or 4B-1 and 4B-2) (the two transceivers 4 in FIG. 1) are present.

The IP telephone set 6 and a Voice over Internet Protocol (VoIP) gateway 7 are connected to the network 1. The telephone set 8 is connected to the VoIP gateway 7. The VoIP gateway 7 is a gateway device that mediates between a VoIP procedure through which an audio signal is transmitted via the network 1 and the telephone set 8 as a verbal communication device.

The relaying device 2 is equipped with a SIP server function. The SIP server function is a function of utilizing a SIP protocol to: relate a telephone number (URI) to an IP address; execute calling control by calling and connecting to a telephone set for a communication partner; and perform a processing of responding to a call from a telephone set.

The transceiver 4 and the repeater 3 are so-called digital transceivers. The digital transceiver sends or receives data in parallel to an audio signal converted in a digital format. The digital transceiver sends or receives control information such as a destination code, as the above data. The repeater 3 packetizes a digital signal received from the corresponding transceiver 4, and enters the packetized signal into the corresponding relaying device 2. Then, the repeater 3 extracts an audio signal and control information from packets received from the corresponding relaying device 2, and converts the audio signal and the control information into respective serial digital signals to send them out.

Figures 2, 3:
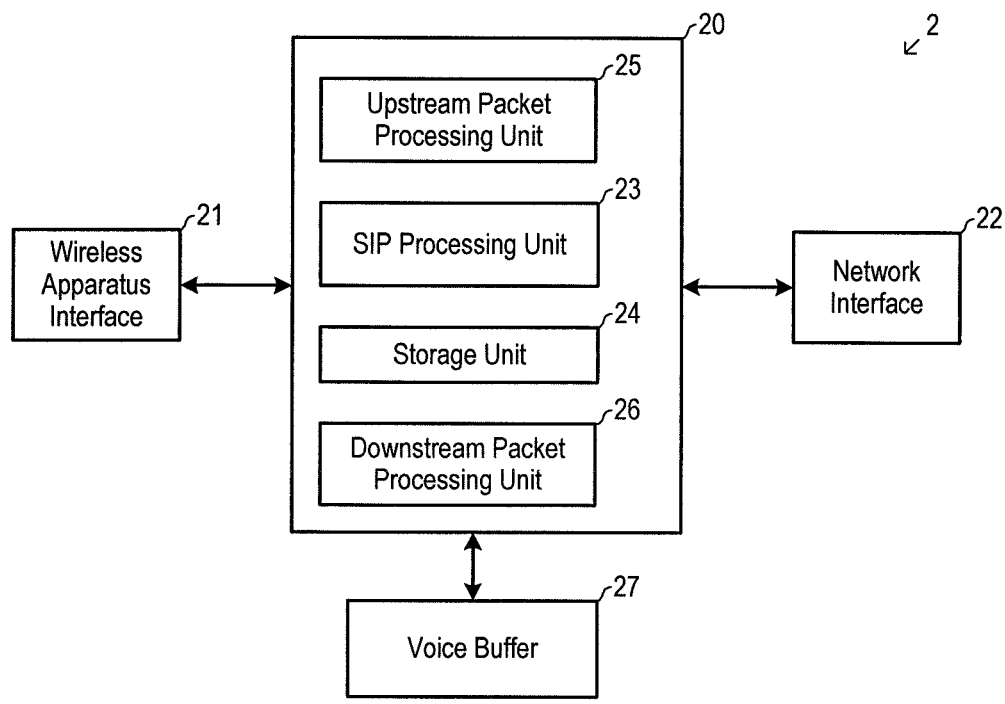
FIG. 2 shows a content stored in a transceiver.
FIG. 3 is a block diagram of the relaying device.

The transceiver 4 stores an ID 400 and a group number 401, as illustrated in FIG. 2. The ID 400 is transceiver ID information to be used to identify a local station. The group number 401 is a number to be used to identify a transceiver group to which the local station pertains. If the ID 400 of its local station or the group number 401 thereof is embedded in a received digital signal, as a destination code, the transceiver 4 demodulates this digital signal into an audio signal, and outputs it from, for example, a speaker. Otherwise, if neither the ID 400 of its local station nor the group number 401 thereof is embedded in a received digital signal, as a destination code, the transceiver 4 discards this digital signal. Here, the ID 400 of a local station and the group number 401 thereof may be embedded in a received digital signal, for example, as a squelch code.

FIG. 3 is a block diagram of the relaying device 2. The relaying device 2 includes a control unit 20, a wireless apparatus interface 21, and a network interface 22. The wireless apparatus interface 21 is provided at a downstream end of the relaying device 2 (or at an end of the relaying device 2 on the side of the repeater 3). The network interface 22 is provided at an upstream end of the relaying device 2 (or at an end of the relaying device 2 on the side of the network 1). The network interface 22 corresponds to an uplink interface according to the present invention. A voice buffer 27 is connected to the control unit 20. As the wireless apparatus interface 21 and the network interface 22, for example, a connector that conforms to a physical layer of Ethernet™ may be used. The wireless apparatus interface 21 and the network interface 22 together serve the purpose of physical and data link layers in digital communication.

The wireless apparatus interface 21 is configured to enter packets received from the repeater 3 into the control unit 20, and to send packets received from the control unit 20 to the repeater 3.

The network interface 22 is configured to enter packets from a device at the other end into the control unit 20 via the network 1, and to send packets received from the control unit 20 to the network 1.

As the control unit 20, a processor such as a microcontroller may be used. The control unit 20 includes, as functional units, a SIP processing unit 23, a storage unit 24, an upstream packet processing unit 25, and a downstream packet processing unit 26. The storage unit 24 is provided with a local station IP address storage area 200, a local station telephone number storage area 201, a outgoing telephone number conversion table 203, and a reception transceiver number conversion table 204, as illustrated in FIGS. 4A to 4C.

The SIP processing unit 23 is configured to, for example, make a call, receive a call, and disconnect a call, in telephone communication. The SIP processing unit 23 is equipped with a SIP server function, and relates a telephone number to an IP address and calls a device at the other end.

The upstream packet processing unit 25 is configured to: read an audio signal from upstream audio packets received from the repeater 3 via the wireless apparatus interface 21; convert the audio signal into RTP packets; and transfer the RTP packets to the network interface 22. In addition, the upstream packet processing unit 25 is configured to read a control signal from the upstream audio packets, and to cause the SIP processing unit 23 to perform predetermined processing in accordance with the control signal. For example, when receiving packets containing a transmission destination code, the upstream packet processing unit 25 causes the SIP processing unit 23 to perform calling processing by using a telephone number of this transmission destination.

The downstream packet processing unit 26 is configured to receive RTP packets from a communication partner (or the telephone set 6 or 8) via the network interface 22, and to transfer an audio signal contained in the RTP packets to the repeater 3 through the wireless apparatus interface 21. The downstream packet processing unit 26 is not configured to entirely transfer, to the repeater 3, an audio signal continuously received in the verbal communication mode. Instead, the downstream packet processing unit 26 is configured to transfer, to the repeater 3, only a time zone of the continuously received audio signal which contains a voice sound. The downstream packet processing unit 26 is equipped with a voice operated relay (VOX) function, and is configured to monitor a level and duration of an audio signal contained in RTP packets that have been received from the network interface 22, thereby detecting a voice sound. When the level of the received audio signal is equal to or higher than a preset threshold and the duration of the received audio signal is equal to or longer than an attack time, the downstream packet processing unit 26 presumes that a voice sound is detected from the audio signal in the RTP packets, and transfers this audio signal to the repeater 3.

The downstream packet processing unit 26 does not promptly transferring, to the repeater 3, an audio signal that would be transferred thereto, but delays the audio signal by buffering it in the voice buffer 27 and then transfers it. The repeater 3 needs to reserve a channel (wireless communication channel) before it starts sending an audio signal. This channel reservation processing requires time of several hundreds of milliseconds if an idle channel is present. If all channels are in a busy state, the required time is further extended, because the repeater 3 needs to wait for any of the channels to be made available. When the downstream packet processing unit 26 determines that a zone of a voice sound starts, it requests the repeater 3 to reserve a channel. Since then, the downstream packet processing unit 26 buffers an audio signal of this voice sound in the voice buffer 27. When the downstream packet processing unit 26 receives a reply indicating that a channel has been reserved, from the repeater 3, the downstream packet processing unit 26 converts the audio signal buffered in the voice buffer 27 into audio packets, and transfers the audio packets to the repeater 3 via the wireless apparatus interface 21. Call information is embedded in these audio packets. When the repeater 3 receives the audio packets from the relaying device 2, it activates the PTT function, and sends the audio signal contained in the audio packets. Consequently, the audio signal of the voice sound is sent while being delayed by a time interval between when the downstream packet processing unit 26 detects the voice sound and when it receives the replay indicating that a channel has been reserved, from the repeater 3.

In this way, the relaying device 2 waits for the repeater 3 to reserve a channel, and then starts transferring a voice sound to the repeater 3. Therefore, when the transceiver 4 receives a voice sound through communication with the repeater 3 and reproduces it, the beginning of the voice sound is not clipped off.

The outgoing telephone number conversion table 203 provided in the storage unit 24 is used to convert a destination code contained in audio packets which the relaying device 2 has received from the transceiver 4 through the repeater 3 into a telephone number. The outgoing telephone number conversion table 203 stores call_types (groups/individuals), destination IDs (identifiers), and telephone numbers while relating them to one another. These telephone numbers correspond to those of the IP telephone set 6 and the telephone set 8 to which the relaying device 2 is connected through the SIP procedure via the network 1.

Since a typical digital transceiver has only a few buttons, it is difficult to input a telephone number thereto directly. Therefore, a destination code to be input in the transceiver 4 is set to a simple numeral sequence, in order to input the destination code with a small number of buttons. The telephone number is composed of a numeral sequence having many more digits, such as eight to ten digits (eight digits in FIG. 4B).

When a user selects a group/individual and a destination ID and turns on a PTT button through a button operation, the transceiver 4 sends audio packets containing this destination code (call_type and destination ID). The audio packets are received by the repeater 3 and transferred to the relaying device 2. The relaying device 2 converts the destination code contained in these audio packets into a telephone number by using the outgoing telephone number conversion table 203.

The reception transceiver number conversion table 204 provided in the storage unit 24 is used to convert a telephone number that the relaying device 2 has received from the telephone set 6 or 8 into a destination code (call_type and destination ID). The reception transceiver number conversion table 204 stores transceiver numbers, call_types (groups/individuals), and destination IDs while relating them to one another. Each transceiver number is composed of a simple numeral sequence having, for example, two digits that can be input on a dial. The destination code is composed of a combination of a call_type (group/individual) and a destination ID, and is a code that designates one of the transceivers 4 or some of them in group, with which the repeater 3 connected to the relaying device 2 can communicate. Herein, the destination code corresponds to transceiver ID information to be embedded, and the transceiver number corresponds to transceiver ID information to be designated.

When the telephone set 6 or 8 communicates with the transceiver 4, a user for the telephone set 6 or 8 dials the telephone number of the relaying device 2, and subsequently dials the transceiver number. When the relaying device 2 is called by using the telephone number, it responds to this call and receives an audio signal. In addition, the relaying device 2 searches the reception transceiver number conversion table 204 by using the transceiver number that has been received from the telephone set 6 or 8, and reads a corresponding destination code. When the relaying device 2 detects a voice sound from the received audio signal, it embeds a destination code in this voice sound, and sends it to the repeater 3. Here, the relaying device 2 delays the audio signal until the repeater 3 reserves a channel, as described above. When the repeater 3 reserves the channel and wirelessly sends the audio signal to only one of the transceivers 4 which is designated by the destination code. Then, this transceiver demodulates and reproduces the audio signal.

In a digital signal sent/received between digital transceivers, a control information frame on which control information, such as a destination code, is to be written is allocated between audio signals. The destination code may be written on this control information frame. Alternatively, the destination code may be written as a squelch code. The digital signal on which the destination code has been written is demodulated and reproduced by only one of the transceivers 4 which is designated by this destination code. Utilizing this function achieves individual verbal communications in the selective calling manner as described above.

Figure 5:
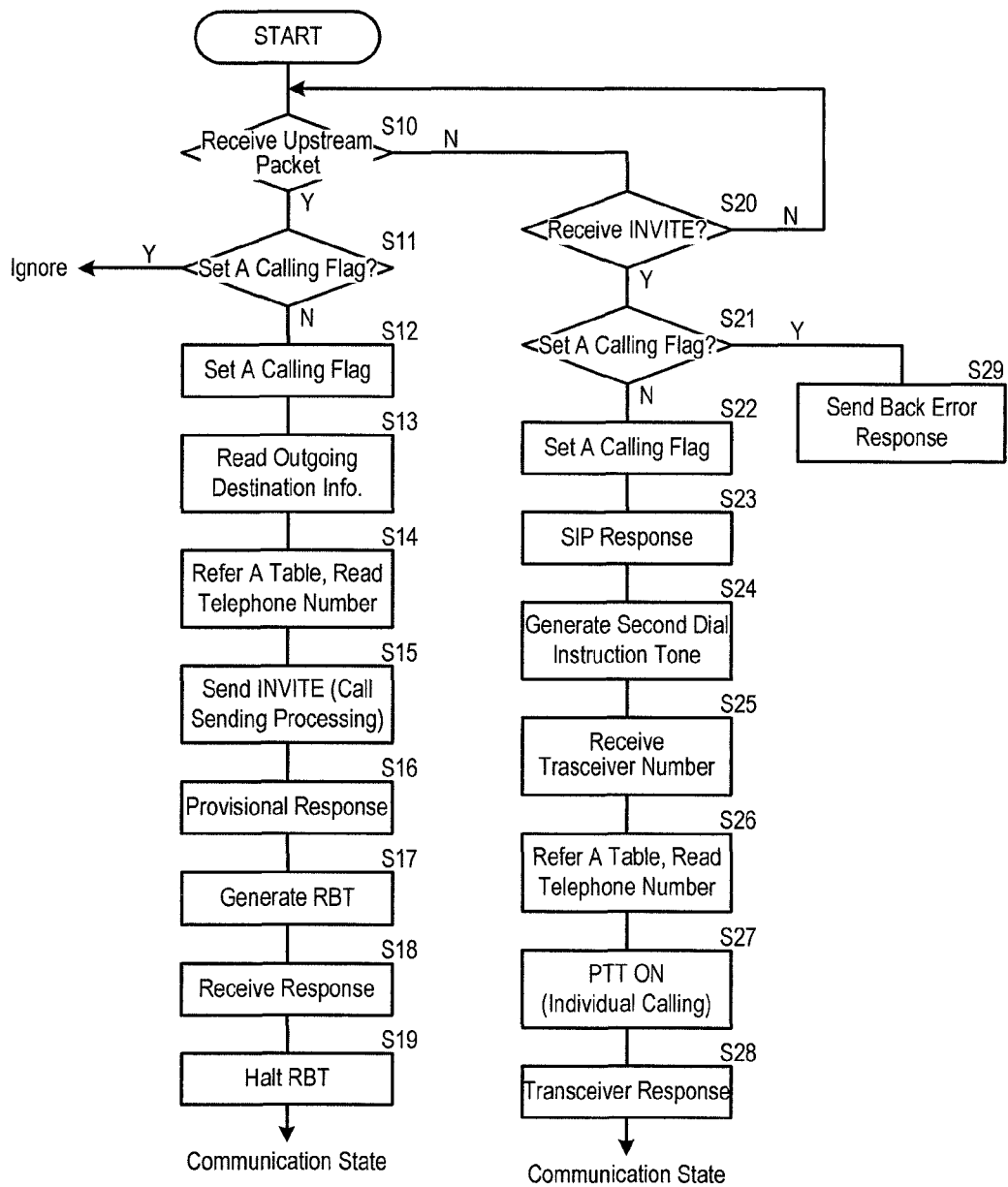
FIG. 5 is a flowchart of an operation in which the relaying device receives and sends a call.

FIG. 5 is a flowchart of an operation in which the relaying device 2 sends and receives a call. The control unit 20 of the relaying device 2 determines whether to have received upstream audio packets from the wireless apparatus interface 21 at Step S10 (hereinafter, the word "Step" is omitted). Here, these upstream audio packets have been sent from the transceiver 4, and have been received by the repeater 3. If receiving the upstream audio packets (YES at S10), the control unit 20 determines whether a calling flag is presently set or not (S11). When the calling flag is set, the relaying device 2 is in the course of the performance of the call sending or receiving processing or the conduction of the verbal communication. If the calling flag is set (YES at S11), the control unit 20 does not perform the processing of the flowchart of FIG. 5. Otherwise, if the calling flag is not set (NO at S11), the control unit 20 performs the following processing. The control unit 20 sets a calling flag (S12). The control unit 20 reads an outgoing destination code from the received audio packets (S13), and reads a telephone number corresponding to the outgoing destination code from the outgoing telephone number conversion table 203 by searching it by using the outgoing destination code (S14). The control unit 20 creates an INVITE message by using this telephone number as a SIP address, and sends it to the network 1 via the network interface 22 (S15).

After that, the control unit 20 receives a provisional response from the telephone set 6 or 8 that is a calling destination (S16). In response, the control unit 20 generates audio packets composed of a ring-back tone (RBT), and outputs them from the wireless apparatus interface 21 (S17). As a result, the RBT is reproduced on the transceiver 4. Here, the provisional response refers to a response indicating that the INVITE request is received and is being processed. Once the control unit 20 receives a formal response from the telephone set 6 or 8 (S18), it halts the RBT (S19), and causes the transceiver 4 and the calling destination to enter a verbal communication state. Processing performed during the verbal communication will be described later.

Since then, if the control unit 20 receives a BYE message from the telephone set 6 or 8, or if an audio signal in downstream packets has a level lower than a threshold over a preset period or longer and the control unit 20 has not received upstream packets over a predetermined period or longer, the control unit 20 disconnects the call, or resets the calling flag, and returns to a standby state.

Through the above processing, the relaying device 2 determines a telephone number, on the basis of a destination code contained in audio packets received from the transceiver 4, and sends an INVITE message to a telephone set to which this telephone number is assigned. This destination code is composed of a simpler numeral sequence than that of a telephone number. Therefore, even if a digital transceiver has only a few buttons, a user for the digital transceiver can call a target telephone number through a simple operation.

Meanwhile, the control unit 20 determines whether to have received an INVITE message via the network interface 22, at S20. This INVITE message is sent from the telephone set 6 or 8 in order to call the relaying device 2. If the control unit 20 receives the INVITE message (YES at S20), it determines whether a calling flag is presently set or not (S21). If the calling flag is set (YES at S21), the control unit 20 sends back an error response to a transmission source of the INVITE message (S29), and terminates the operation. This is because the relaying device 2 is presently in the course of the performance of a call sending or receiving processing or the conduction of the verbal communication, and cannot accept a new call. Otherwise, if the calling flag is not set (NO at S21), the control unit 20 performs the following processing. The control unit 20 sets a calling flag (S22), and responds to this INVITE message through the SIP procedure (S23). The control unit 20 sends a second dial instruction tone to a device at the other end that is a transmission source of the INVITE message (S24). Here, the second dial instruction tone is a voice that encourages the input of a transceiver number.

Once the control unit 20 receives a transceiver number from the device at the other end, in response to the second dial instruction tone (S25), the control unit 20 reads a destination code corresponding to the transceiver number from the reception transceiver number conversion table 204 by searching it by using the transceiver number (S26). Then, the control unit 20 instructs the repeater 3 to send audio packets containing a destination code to the device at the other end, in order to call it (S27). When the transceiver 4 responds to this instruction (S28), the control unit 20 sets the transceiver 4 and the telephone set 6 or 8, which is the device at the other end, to enter a verbal communication state.

Through the above processing, even when the repeater 3 is in a state of being able to communicate with the plurality of transceivers 4, the relaying device 2 enables one or more of the transceivers 4 and the telephone set 6 or 8 to enter a verbal communication state by causing the repeater 3 to send audio packets in which a transceiver number of a destination is embedded.

Next, a description will be given of processing performed during the verbal communication state. During the verbal communication state, the relaying device 2 prioritizes upstream packets received from the repeater 3. Here, the upstream packets correspond to an audio signal from the transceiver 4. While receiving upstream packets, the relaying device 2 transfers them to the telephone set 6 or 8, regardless of the content of the downstream packets. Meanwhile, while the relaying device 2 is not receiving no upstream packets, when downstream packets which the relaying device receives from the telephone set 6 or 8 via the network 1 contain a voice sound, the relaying device 2 transfers this voice sound to the repeater 3.

Figure 7:
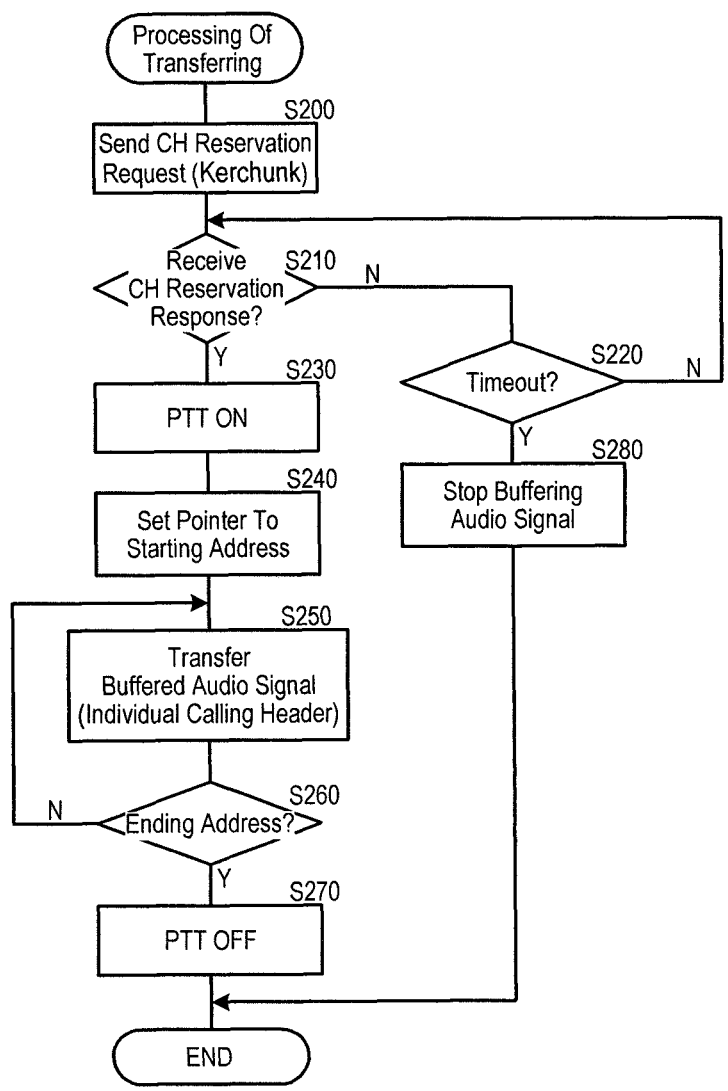
FIG. 7 is a flowchart of an operation of the relaying device during verbal communication.

FIGS. 6A, 6B and 7 are flowcharts of steps of processing a downstream audio signal in the verbal communication state. FIG. 6A is a flowchart of a processing of receiving downstream packets. Once the control unit 20 receives RTP packets, or downstream packets, from the network interface 22 (S120), the control unit 20 (downstream packet processing unit 26) extracts an audio signal from the RTP packets, and decodes it (S121). The control unit 20 subjects the decoded audio signal to the VOX processing (S123).

The VOX processing is a processing of detecting a voice sound from the received audio signal. The control unit 20 monitors the level and duration of the received audio signal. When the level of the audio signal continues to be equal to or higher than a threshold over the attack time or longer, the control unit 20 determines that a voice sound is present, and then turns on a VOX signal. Meanwhile, when the level of the audio signal continues to be less than the threshold over a predetermined period or longer while the VOX signal is in an ON state, the control unit 20 determines that the voice sound is no longer present, and then turns off the VOX signal.

FIG. 6B is a flowchart of processing performed in relation to ON/OFF of the VOX signal in the control unit 20. When the VOX signal is turned on (YES at S130), the control unit 20 activates a transfer processing as in FIG. 7 (S131). Simultaneously, the control unit 20 starts buffering an audio signal (S132). In this case, the control unit 20 stores a write address of the voice buffer 27 at this time as a starting address (S133).

Meanwhile, when the VOX signal is turned off (YES at S140), the control unit 20 stops buffering the audio signal (S141). In this case, the control unit 20 stores a write address of the voice buffer 27 at this time as an ending address (S142).

If the verbal communication ends between the transceiver 4 and the telephone set 6 or 8 (YES at S150), the control unit 20 stops the processing of receiving the packets as in FIG. 6A (S151). If the VOX signal is in the ON state, or the audio signal is being buffered, at present (YES at S152), the control unit 20 stops buffering the audio signal (S141), and stores a write address of the voice buffer 27 at this time as an ending address (S142).

FIG. 7 is a flowchart of a processing of transferring a voice sound. When the VOX signal is turned on, this processing is performed. In this processing, the control unit 20 (downstream packet processing unit 26) sends the repeater 3 a message of a channel reservation request (S200). Then, the control unit 20 stands by until it receives a channel reservation response from the repeater 3 (S210) or until a timeout occurs as a result of the repeater 3 not to respond to the message of the channel reservation request (S220).

If the control unit 20 receives the channel reservation response which the repeater 3 has sent in response to the message of the channel reservation request (YES at S210), the control unit 20 performs the following processing. The control unit 20 sets the repeater 3 to a transmission state (PTT-ON) (S230). The control unit 20 sets a readout pointer for the voice buffer 27 to the starting address stored at S133 (S240). Then, the control unit 20 sequentially reads the audio signal buffered in the voice buffer 27, and transfers it to the repeater 3 via the wireless apparatus interface 21 (S250). The audio signal is packetized, and individual calling data is added to each header of the packets. The control unit 20 continues transferring the audio signal until the readout pointer reaches the ending address. If the readout pointer reaches the ending address (YES at S260), the control unit 20 releases the transmission state of the repeater 3 (PTT OFF) (S270), and terminates the processing.

If a timeout occurs as a result of the repeater 3 not to respond to the message of the channel reservation request (YES at S220), the control unit 20 stops buffering the audio signal (S280), and terminates the processing without transferring the buffered audio signal to the repeater 3.

In the processing described with reference to FIG. 6A, 6B or 7, the control unit 20 buffers the audio signal only during a time interval between when the control unit 20 detects the voice sound (VOX-ON) and when it does not detect the voice sound (VOX-OFF). However, in the verbal communication state, the control unit 20 may continuously buffer the audio signal, and read only a zone of this audio signal in which a voice sound is detected and transfer it to the repeater 3.

A description will be given of steps of processing an audio signal in the verbal communication state, at which the control unit 20 continuously buffers the audio signal, with reference to flowcharts of FIGS. 8A, 8B and 9. In the flowcharts of FIGS. 8A, 8B and 9, the same step numbers are assigned to the same processing steps as those in the flowcharts of FIGS. 6A, 6B and 7.

FIG. 8A is a flowchart of a processing of receiving downstream packets in the verbal communication state. Once the control unit 20 receives RTP packets, or downstream packets, from the network interface 22 (S120), the control unit 20 (downstream packet processing unit 26) extracts an audio signal from the RTP packets, and decodes it (S121). The control unit 20 stores this audio signal in the voice buffer 27 (S122). In parallel, the control unit 20 subjects this audio signal to the VOX processing (S123). The VOX processing is performed in the above manner.

FIG. 8B is a flowchart of processing performed in relation to ON/OFF of the VOX signal in the control unit 20. If the VOX signal is turned on (YES at S130), the control unit 20 activates a transfer processing as in FIG. 9 (S131), and stores a write address of the voice buffer 27 at which the audio signal is stored at this time, as a starting address (S133).

If the VOX signal is turned off (YES at S140), the control unit 20 stores a write address of the voice buffer 27 at this time, as an ending address (S142).

Meanwhile, if the verbal communication ends between the transceiver 4 and the telephone set 6 or 8 (YES at S150), the control unit 20 stops the processing of receiving the audio packets as in FIG. 8A (S151). If the VOX signal is in an ON state (YES at S152), the control unit 20 stores a write address of the voice buffer 27 at this time, as an ending address (S142).

FIG. 9 is a flowchart of a processing of transferring a voice sound. When the VOX signal is turned on, this processing is performed. In this processing, the control unit 20 (downstream packet processing unit 26) sends the repeater 3 a message of a channel reservation request (S200). Then, the control unit 20 stands by until it receives a channel reservation response from the repeater 3 (S210) or until a timeout occurs as a result of the repeater 3 not to respond to the message of the channel reservation request (S220).

If the control unit 20 receives the channel reservation response which the repeater 3 has sent in response to the message of the channel reservation request (YES at S210), the control unit 20 performs the following processing. The control unit 20 sets the repeater 3 to a transmission state (PTT-ON) (S230). The control unit 20 sets a readout pointer for the voice buffer 27 to an address located ahead of the starting address stored at S133 at a distance corresponding to the attack time of the VOX signal (S241). Then, the control unit 20 sequentially reads the audio signal buffered in the voice buffer 27, and transfers the audio signal to the repeater 3 via the wireless apparatus interface 21 (S250). The audio signal is packetized, and individual calling data is added to each header of the packets. The control unit 20 continues transferring the audio signal until the readout pointer reaches the ending address. If the readout pointer reaches the ending address (YES at S260), the control unit 20 releases the transmission state of the repeater 3 (PTT OFF) (S270), and terminates the processing.

If a timeout occurs as a result of the repeater 3 not to respond to the message of the channel reservation request (YES at S220), the control unit 20 terminates the processing without transferring the buffered audio signal to the repeater 3.

As described above, the control unit 20 starts reading the audio signal at the address that is located ahead of the starting address at the distance corresponding to the attack time, at S241. Therefore, during the VOX processing, the control unit 20 can transfer the voice sound to the repeater 3, without causing part of the voice sound to be clipped off which has been received before the VOX signal used to determine the voice sound is turned on.

It should be noted that the time length corresponding to the distance at which the readout pointer is located ahead of the starting address at S241 is not limited to the attack time. This time length may be adjusted in accordance with a time interval between when the control unit 20 sends a message of a channel reservation request and when it receives a channel reservation response. If the time interval between when the control unit 20 sends a message of a channel reservation request and when it receives a channel reservation response considerably extends, the control unit 20 may decrease the above time interval or may set it to zero, so that the delay of the voice sound can be suppressed from extending.

In the above embodiments, an audio signal in a packet form is sent or received between the repeater 3 and the relaying device 2. However, an audio signal in a digital time-based form or in an analog form is sent or received therebetween. Thus, there is no limitation on the format of an audio signal, as long as any given calling information is superposed on the audio signal.

In the above embodiments, a downstream audio signal in the RTP packets is sent; however it may be in any other format in the present invention. Examples of the format of a downstream audio signal include, but are not limited to, a baseband digital audio signal and an analog audio signal.

REFERENCE NUMERALS

1 network
2 relaying device
3 repeater
4 transceiver
6 IP telephone set
7 VoIP gateway
8 telephone set

What is claimed is:

1. A relaying device establishing a communication between an IP phone that is one of IP phones connected to a network and a transceiver that is one of radio transceivers making a wireless communication through a repeater,
   the transceiver
      wirelessly transmitting an audio signal,
      making an individual communication with another transceiver using a destination ID, which is defined as data to identify the another transceiver,
      storing a plurality of the destination IDs, and transmitting one of the destination IDs selected by a user in the wireless communication to the relaying device,
   the relaying device being provided with a wireless apparatus interface (21) connected to the repeater, a network interface (22) connected to the network, and a control unit (20),
      the control unit converting the audio signal, which is transmitted from the transceiver and is input from the wireless apparatus interface, into packets in order to transmit through the network, and forwarding the packets to the network through the network interface, further converting the audio signal, which is transmitted from the IP phone and is input from the network interface, into an audio signal that is in accordance with a regulation of the transceiver, and forwarding the converted audio signal to the repeater through the wireless apparatus interface,
      further the control unit having a destination correspondence table in which the plurality of the destination IDs and a plurality of SIP addresses of the IP phones are stored, each of the destination IDs being assigned to one of the IP phones, wherein
   when receiving the destination ID transmitted from the transceiver, the control unit
      refers to the destination correspondence table, reads out one of the SIP addresses that is corresponded to the destination ID,
      transmits an Invite message that is in accordance with SIP protocol to the read SIP address, and makes a call to one of the IP phones that is destined by the SIP address assigned with the destination ID, and
   after receiving a response from the IP phone, the control unit converts audio signals from both sides, forwards them from one side to the other side.

2. The relaying device according to claim 1, wherein a telephone number of the IP phone is written in the form of a URI of the SIP protocol.

3. A communication system comprising:
   a relaying device described in claim 1, a repeater connected to a wireless apparatus interface of the relaying device and a transceiver communicating with the repeater, wherein
   the transceiver transmits an audio signal embedding a destination ID, the destination ID having the same format as the format of a calling information for a selecting call between transceivers,
   the repeater receives the audio signal transmitted by the transceiver and forwards the audio signal to the relaying device, and
   the relaying device inputs the audio signal, determines the SIP addresses by the destination ID, prepares the Invite message and sends the Invite message on the network.

* * * * *